(12) United States Patent
Rao et al.

(10) Patent No.: US 11,194,634 B2
(45) Date of Patent: Dec. 7, 2021

(54) APPARATUS AND METHOD FOR PROVIDING WORKLOAD DISTRIBUTION OF THREADS AMONG MULTIPLE COMPUTE UNITS

(71) Applicant: Advanced Micro Devices, Inc., Santa Clara, CA (US)

(72) Inventors: Karthik Rao, Austin, TX (US); Shomit N. Das, Austin, TX (US); Xudong An, Austin, TX (US); Wei Huang, Dallas, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/220,827

(22) Filed: Dec. 14, 2018

(65) Prior Publication Data
US 2020/0192705 A1 Jun. 18, 2020

(51) Int. Cl.
*G06F 9/46* (2006.01)
*G06F 9/50* (2006.01)
(Continued)

(52) U.S. Cl.
CPC .......... *G06F 9/5094* (2013.01); *G06F 9/3867* (2013.01); *G06F 9/3877* (2013.01); *G06F 9/4893* (2013.01); *G06F 9/5027* (2013.01); *H04L 67/12* (2013.01); *G06F 1/3206* (2013.01); *G06F 3/0613* (2013.01); *G06F 13/409* (2013.01); *H04N 19/436* (2014.11)

(58) Field of Classification Search
CPC ...... G06F 1/206; G06F 9/5044; G06F 9/5094; G06F 9/5027; G06F 9/4894; G06F 9/3867; G06F 9/3877; G06F 9/4893; G06F 67/12; G06F 13/409; G06F 1/3206; G06F 3/0613; H04N 19/436
See application file for complete search history.

(56) References Cited

U.S. PATENT DOCUMENTS

2006/0095913 A1* 5/2006 Bodas .................. G06F 9/5094
                                                         718/100
2008/0219349 A1* 9/2008 Huang ................. H04N 19/436
                                                         375/240.15
(Continued)

*Primary Examiner* — Tuan A Vu
(74) *Attorney, Agent, or Firm* — Faegre Drinker Biddle & Reath LLP

(57) ABSTRACT

In some examples, thermal aware optimization logic determines a characteristic (e.g., a workload or type) of a wavefront (e.g., multiple threads). For example, the characteristic indicates whether the wavefront is compute intensive, memory intensive, mixed, and/or another type of wavefront. The thermal aware optimization logic determines temperature information for one or more compute units (CUs) in one or more processing cores. The temperature information includes predictive thermal information indicating expected temperatures corresponding to the one or more CUs and historical thermal information indicating current or past thermal temperatures of at least a portion of a graphics processing unit (GPU). The logic selects the one or more compute units to process the plurality of threads based on the determined characteristic and the temperature information. The logic provides instructions to the selected subset of the plurality of CUs to execute the wavefront.

20 Claims, 8 Drawing Sheets

(51) Int. Cl.
  *G06F 9/48* (2006.01)
  *G06F 9/38* (2018.01)
  *H04L 29/08* (2006.01)
  *G06F 1/3206* (2019.01)
  *G06F 13/40* (2006.01)
  *G06F 3/06* (2006.01)
  *H04N 19/436* (2014.01)

(56) References Cited

U.S. PATENT DOCUMENTS

| | | | |
|---|---|---|---|
| 2011/0167229 A1* | 7/2011 | Szalay | G06F 3/0613 |
| | | | 711/154 |
| 2012/0297395 A1* | 11/2012 | Marchand | G06F 9/5027 |
| | | | 718/104 |
| 2015/0192978 A1* | 7/2015 | Ghose | G06F 13/409 |
| | | | 713/323 |
| 2016/0092363 A1* | 3/2016 | Wang | G06F 1/3206 |
| | | | 711/119 |
| 2017/0083065 A1* | 3/2017 | Huang | G06F 1/206 |
| 2018/0239641 A1* | 8/2018 | Kumar | G06F 9/5044 |

* cited by examiner

APPARATUS AND METHOD FOR PROVIDING WORKLOAD DISTRIBUTION OF THREADS AMONG MULTIPLE COMPUTE UNITS

GOVERNMENT LICENSE RIGHTS

This invention was made with Government support under PathForward Project with Lawrence Livermore National Security (Prime Contract No. DE-AC52-07NA27344, Subcontract No. B620717) awarded by the Department of Energy (DOE). The Government has certain rights in this invention.

BACKGROUND OF THE DISCLOSURE

Graphics processing units (GPUs) have emerged as a first-class computing platform. The massive data parallelism of GPUs was first leveraged by highly-structured parallel tasks such as matrix multiplications. However, GPUs have more recently found use across a broader range of application domains such as deep learning, graph analytics, data analytics, computer-aided-design, oil and gas exploration, medical imaging, cloud computing, supercomputing, and computational finance.

Each GPU includes multiple compute units to execute wavefronts. Wavefronts are sets of threads, which are different sequences of programmable instructions. Traditionally, the GPU distributes threads to compute units on a first come, first serve basis. In other words, when a work queue buffer obtains a set of threads, the GPU assigns the unexecuted threads to any available, idle compute unit. However, certain compute units have associated higher thermal costs (e.g., proximity to high temperature regions) for executing the threads than others. Eventually, this may cause the GPU to slow down and/or overheat. As such, there exists a need for improved methods and apparatus in order to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Figure 1:
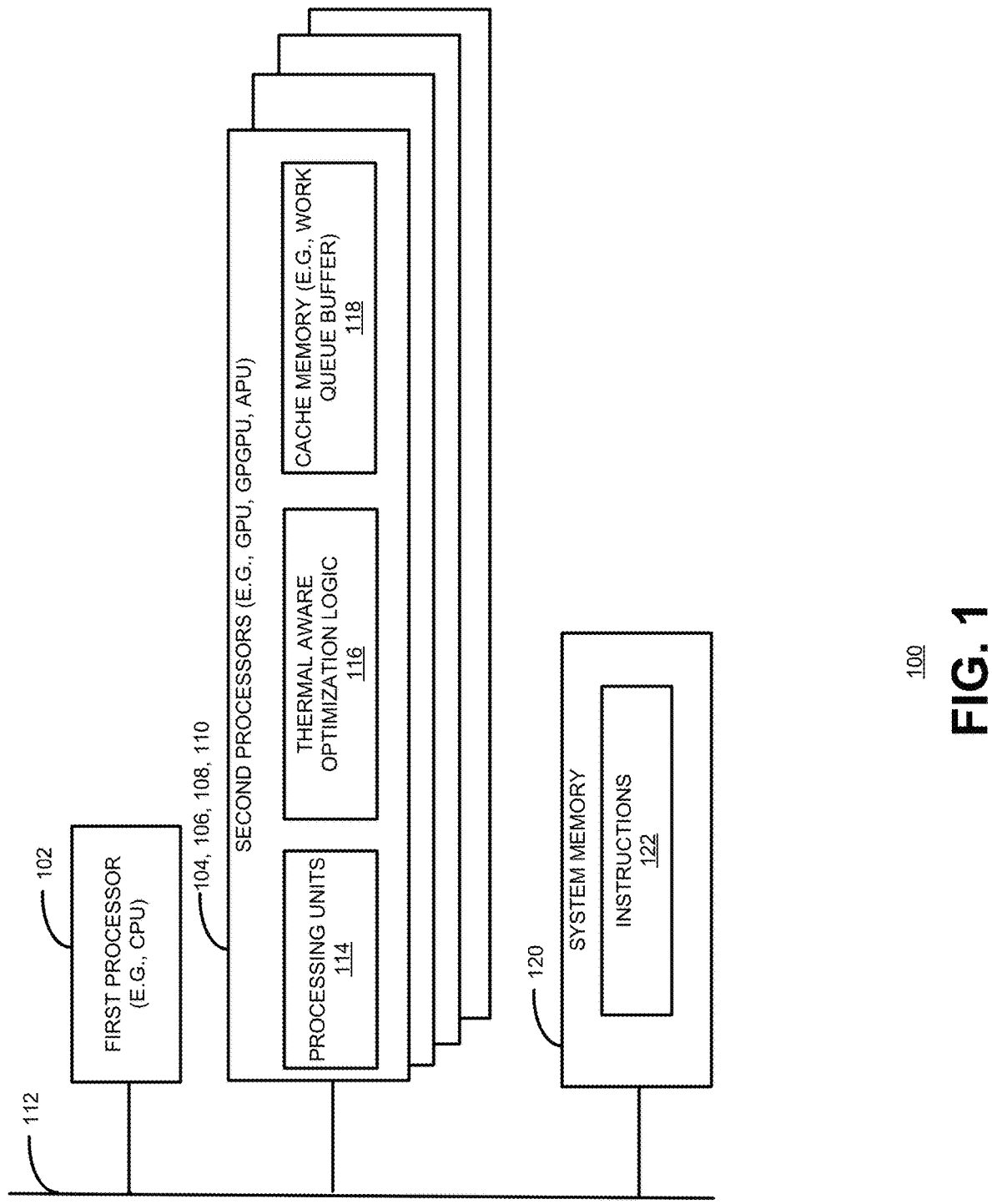
FIG. 1 is a schematic block diagram illustrating an example of an apparatus for providing workload distribution of threads among multiple compute units in accordance with one variation set forth in the disclosure.

In some examples, methods and apparatuses provide workload distribution of threads among multiple compute units. For example, since temperature is a function of power density and not power alone, scheduling work appropriately on the CUs becomes an important problem in order to extract the most performance out of the GPU. Thus, the method and apparatus distribute threads (e.g., wavefronts) to selected compute units based on thermal feedback of the graphics processing unit (GPU), locations of heat sources (e.g., components) of the GPU, and/or characteristics of the wavefront. By selecting CUs based on thermal information (e.g., distributing the wavefronts across different locations within the GPUs), the method and apparatus reduces the maximum temperature of the GPU and/or improves performance of the GPU by reducing the effect of thermal throttling (e.g., throttling of the GPU's clock frequencies).

In some variations, thermal aware optimization logic determines a characteristic (e.g., a workload or type) of a wavefront (e.g., multiple threads). For example, the characteristic indicates whether the wavefront is compute intensive, memory intensive, mixed, and/or another type of wavefront. The thermal aware optimization logic determines temperature information for one or more compute units (CUs) in one or more processing cores. The temperature information includes predictive thermal information indicating expected temperatures corresponding to the one or more CUs and historical thermal information indicating current or past thermal temperatures of at least a portion of a graphics processing unit (GPU). The logic selects the one or more compute units to process the plurality of threads based on the determined characteristic and the temperature information. The logic provides instructions to the selected subset of the plurality of CUs to execute the wavefront.

In some instances, the logic determines characteristics for multiple wavefronts currently being executed by the CUs. The logic generates the predictive thermal information based on the characteristics for the wavefronts being executed by the CUs. In some examples, the portion of the GPU that the logic has historical thermal information for includes at least one non-CU circuitry, such as a memory controller, heat source, and/or other non-CU components within the GPU. In some variations, the logic obtains temperature readings from multiple temperature sensors operatively coupled to different regions and/or components of the GPU. The logic generates historical thermal information based on the temperature readings from the temperature sensors.

In some variations, a processor (a first GPU) includes the logic. Further, the logic determines characteristics for wavefronts being executed by CUs on another (a second GPU) processor. The processors are stacked on top of each other. The logic generates predictive thermal information based on the characteristics of the wavefronts being executed by the CUs on the second GPU. In some instances, the second GPU includes at least one non-CU circuitry. The logic generates predictive thermal information based on a location of the non-CU circuitry. In some examples, the second GPU includes temperature sensors. The logic obtains temperature readings from the temperature sensors on the second GPU.

The logic generates historical thermal information based on the temperature readings from the temperature sensors.

In some variations, the logic determines whether the wavefront is a memory intensive wavefront, a computational intensive wavefront, or a mixed (e.g., memory and computational intensive) wavefront. In some examples, the logic selects the subset of CUs based on whether the wavefront is memory intensive, computational intensive, or mixed.

FIG. 1 illustrates one example of an apparatus 100 for providing workload distribution of wavefronts (e.g., threads) among multiple compute units. In some implementations, the apparatus 100 includes any type of computing device suitable for implementing aspects of embodiments of the disclosed subject matter. Examples of computing devices include but are not limited to workstations, laptops, desktops, tablet computers, hand-held devices, display devices, media players, set-top boxes, televisions, game consoles, printers, servers, cloud computing platforms, integrated circuits and the like, all of which are contemplated within the scope of FIG. 1, with reference to various components of the apparatus 100.

In some examples, the apparatus 100 includes a bus 112 that directly and/or indirectly couples the following devices: a first processor (e.g., central processing unit (CPU)), one or more second processors (e.g., graphics processing unit (GPU), general purpose GPU (GPGPU), and/or accelerated processing unit (APU)), and apparatus or system memory 120. Any number of additional components, different components, and/or combinations of components is also included in the apparatus 100.

The bus 112 represents one or more busses (such as, for example, an address bus, data bus, or combination thereof). Similarly, in some implementations, the apparatus 100 includes a number of first processors 102 and/or a number of memory components 640. Further, solely for the sake of brevity, four second processors 104, 106, 108, 110 are shown in FIG. 1. However, in some variations, the apparatus 100 includes any number of second processors (e.g., GPUs). For example, in one variation, the apparatus 100 includes one GPU. In other variations, the apparatus 100 includes ten or fifteen GPUs. Additionally, any number of these components, or combinations thereof, is distributed and/or duplicated across a number of computing devices.

In some examples, each of the second processors 104, 106, 108, 110 includes processing units 114, thermal aware optimization logic 116, and cache memory 118 (e.g., a work queue buffer). The thermal aware optimization logic (logic) 116 obtains wavefronts (e.g., a set of threads) and thermal information. Then, based on the thermal information and a characteristic of the wavefront, the logic 116 selects one or more compute units (CUs) to execute the wavefront, and provides instructions to the selected CUs to execute the wavefront. The operation of the processing units 114, thermal aware optimization logic 116, and cache memory 118 are described in further detail below.

In some examples, the system memory 120 includes computer-executable instructions 122 that when executed cause the first processor 102 and second processors 104, 106, 108, 110 to implement aspects of embodiments of apparatus components discussed herein and/or to perform aspects of embodiments of methods and procedures discussed herein. The memory 120 may be RAM, ROM, or any suitable memory. The illustrative apparatus 100, including the thermal aware optimization logic 116, is not intended to suggest any limitation as to the scope of use or functionality of embodiments of the present disclosure.

Figure 2:
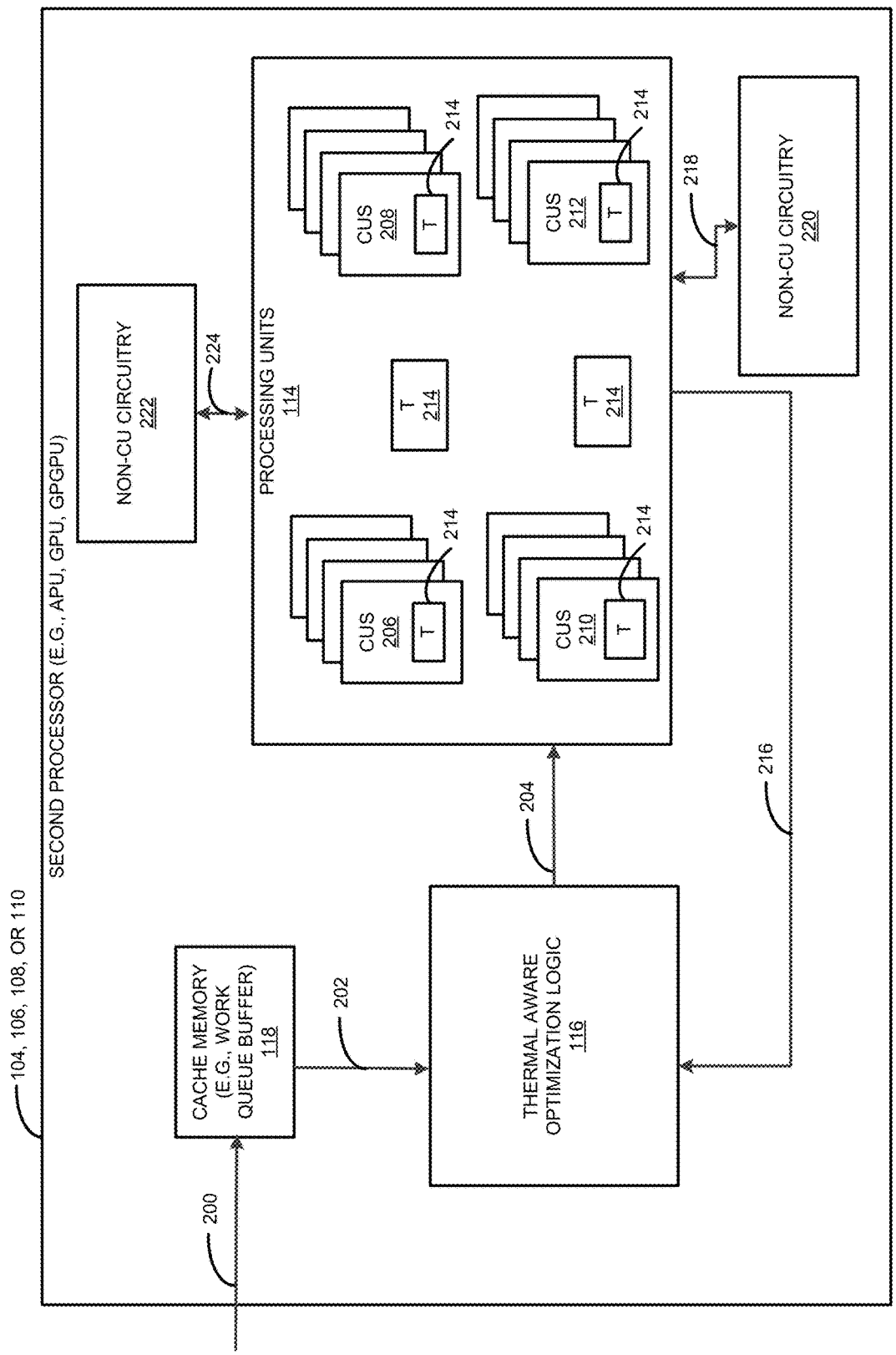
FIG. 2 is an exemplary representation of a second processor, such as a graphics processing unit, in accordance with one variation set forth in the disclosure.

FIG. 2 illustrates an example of a second processor that provides workload distribution of wavefronts (e.g., threads) among multiple compute units. In particular, FIG. 2 shows one of the second processors 104, 106, 108, 110. Below, the components of the second processor 104 are described solely for brevity, and the other second processors of apparatus 100, including second processors not shown in FIG. 1, can function similarly and/or include components similar to second processor 104.

Figure 3:
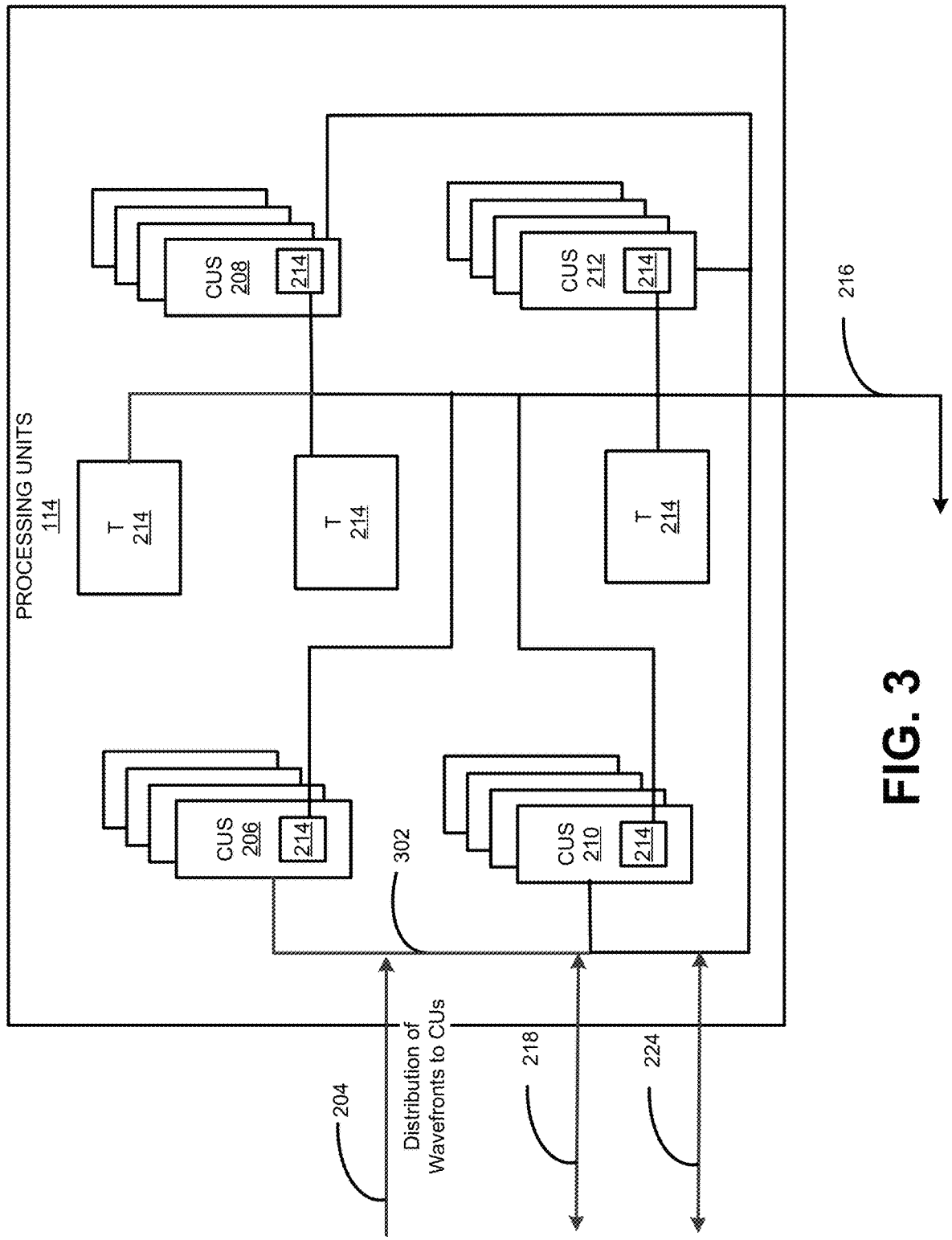
FIG. 3 an exemplary representation of processing units and compute units in accordance with one variation set forth in the disclosure.

The second processor 104 includes cache memory 118 (e.g., a work queue buffer), the logic 116, non-CU circuitry 220, non-CU circuitry 222, and processing units 114. The cache memory 118, logic 116, and the non-CU circuitry 220 and 222 will be described in further detail below. FIG. 3 illustrates an example of the processing units 114. The processing units 114 includes one or more temperature sensors 214, CUs 206, 208, 210, 212, and a bus 302. The bus 302 directly and/or indirectly couples the temperature sensors 214 and CUs 206, 208, 210, 212. Additionally, and/or alternatively, the CUs 206, 208, 210, 212 use the bus 302 to obtain information 204, 218, 224 and/or provide information 218, 224, 216 to one or more components within the second processor 104, GPU 104, and/or other devices within the apparatus 100. Any number of additional components, different components, and/or combinations of components can also be included in the processing units 114.

In particular, the processing units 114 includes sets of one or more CUs 206, 208, 210, 212, temperature sensors 214, and a bus 302. Each of the sets of CUs 206, 208, 210, and 212 includes one or more CUs. In some instances, a shader engine includes a group or set of CUs (e.g., 206, 208, 210, 212). The GPU includes at least one group of shader engines (e.g., the group of the CUs 206, 208, 210, 212). In some variations, the sets of CUs (e.g., a shader engine) is referred to as a processor core or GPU core. In some examples, the processing units 114 includes 64 CUs. However, the GPU 104 can include any number of CUs within the processing units 114. Additionally, and/or alternatively, in some instances, the GPU 104 includes more than one processing units 114, and each of the processing units 114 includes a number of CUs.

Further, as shown in FIGS. 2 and 3, the processing units 114 includes one or more temperature sensors 214. Each temperature sensor 214 detects and/or provides temperature readings or feedback 216 to the logic 116. The temperature sensor 214 can be any sensor, such as an on-die temperature sensor, that detects and/or provides temperature feedback 216 to the logic 116. In some examples, each CU within the sets of CUs 206, 208, 210, 212 includes and/or is operatively coupled to one or more temperature sensors 214. In other instances, some CUs within the sets of CUs 206, 208, 210, 212 include a temperature sensor 214 and some CUs do not include a temperature sensor 214. Additionally, and/or alternatively, the processing units 114 includes multiple temperature sensors 214 that are not operatively coupled to or included with the CUs (e.g., in between the CUs).

Also, the GPU 104 includes temperature sensors 214 that are not within the processing units 114. For example, the non-CU circuitry 220 and 222 includes and/or is operatively coupled to a temperature sensor 214. Additionally, and/or alternatively, the GPU 104 also includes other temperature sensors 214 (not shown) that are not within the processing units 114 and/or the non-CU circuitry 220 and 222.

Figure 4:
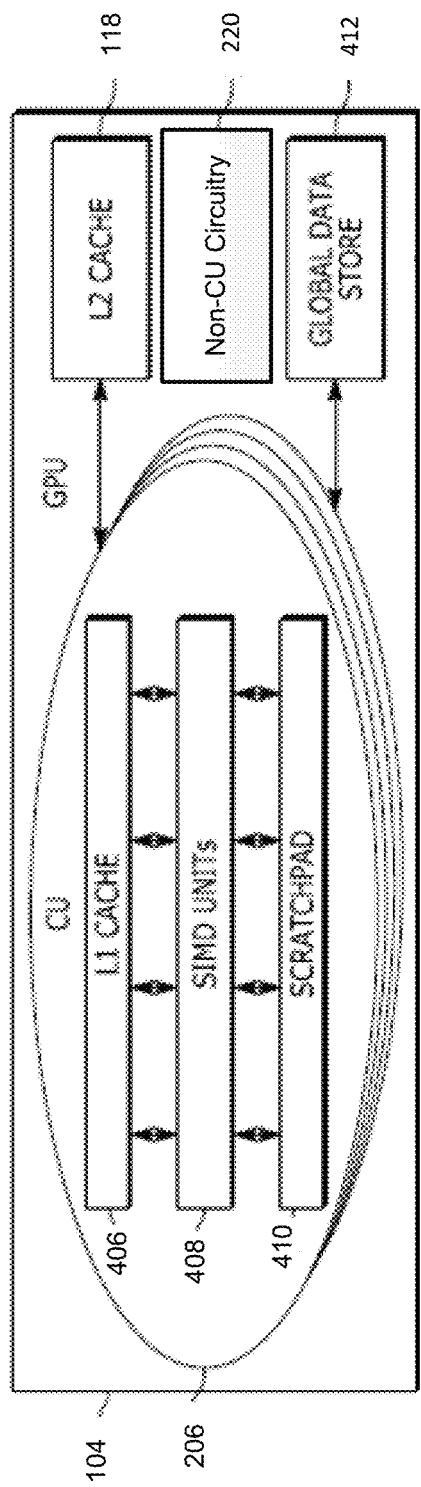
FIG. 4 an exemplary representation of compute units in accordance with one variation set forth in the disclosure.

FIG. 4 illustrates an example of the components of a CU shown in FIGS. 2 and 3. For example, compute units of the GPU are basic computational blocks of the GPU 104, and there are typically 8 to 64 CUs in a GPU 104. Each CU, such as a CU from the set of CUs 206, includes multiple Single-Instruction-Multiple-Data (SIMD) units 408, each SIMD unit 408 has multiple (e.g., 16) lanes of execution. Threads are scheduled to SIMD units 408 in a bundle called a wavefront (or warp), which is typically composed of 32 or 64 threads. These wavefronts execute the same instruction with different data on a SIMD unit 408.

The memory resources of the GPU 104 are also arranged in a hierarchy. For example, each CU 206 has a private L1 data cache 406 and a scratchpad 410 that are shared across the SIMD units 408 within the CU 206. Further, a large L2 cache 118 is shared across all CUs 206, 208, 210, 212 in a GPU 104. Also, a global data store 412 is scratchpad memory for the GPU 104, and is used by GPU applications to improve performance. The non-CU circuitry 220 is any circuitry that is within the GPU 104 and is not a CU. Non-CU circuitry 220 will be described in further detail below.

Below, the set of compute unit(s) 206 will be described solely for brevity, and the other compute units 208, 210, 212 of apparatus 100, including other compute units not shown in FIG. 2, can function similarly and/or include components similar to the compute unit(s) 206. Further, FIGS. 2, 3, and 4 will be described together below, and will reference the apparatus 100 of FIG. 1.

Referring to FIG. 2, in operation, the work queue buffer 118 (e.g., a work queue buffer stored in cache memory, such as L2 or L3 cache) obtains and stores wavefronts 200. For example, the CPU 102 and/or another entity executes instructions and/or provides wavefronts 200 to the work queue buffer 118. Wavefronts are a set (e.g., multiple) of threads, and each thread includes one or more programmable instructions.

The work queue buffer 118 stores the one or more wavefronts from the CPU 102 and queues the wavefronts. The logic 116 obtains (e.g., receives and/or retrieves) a wavefront from the work queue buffer 118. The logic 116 determines characteristics of the wavefront and temperature information for the GPU 104. Based on the determined characteristic and temperature information, the logic 116 provides instructions to a selected CU or set of CUs (e.g., 206) to execute the wavefront. After, the logic 116 obtains another wavefront, and the process repeats. The operation of logic 116 will be described in further detail below.

The CUs 206, 208, 210, 212 from the processing units 114 execute the wavefronts and provides information to CUs within the processing units 114, components of the GPU 104, other devices within the apparatus 100, and/or other apparatuses that are in communication with (e.g., wirelessly and/or wired) the apparatus 100. The temperature sensor 214 detects, determines, and/or provides temperature feedback 216 to the logic 116.

The CUs 206, 208, 210, 212 use bus 302 to obtain and/or provide information 218, 224 to non-CU circuitry 220, 222. The non-CU circuitry 220 and 222 is any component, entity, or circuitry within the GPU 104 that is not a CU and thermally impacts the GPU 104. In other words, the non-CU circuitry 220, 222 are heat sources and/or sinks within the GPU 104 that impacts temperature of the GPU 104. In some examples, the non-CU circuitry 220 and 222 are input/output units, memory controllers, crossbar bridges, through silicon vias (TSVs) and/or other circuitry within the GPU 104. In other examples, the non-CU circuitry 220, 222 is not circuitry but a vent or other entity that permits air flow and/or cooling to the GPU 104. Solely for the sake of brevity, two non-CU circuitry 220, 222 are shown in FIG. 2. However, in some variations, the apparatus 100 and/or the GPU 104 includes any number of non-CU circuitry.

Figure 5:
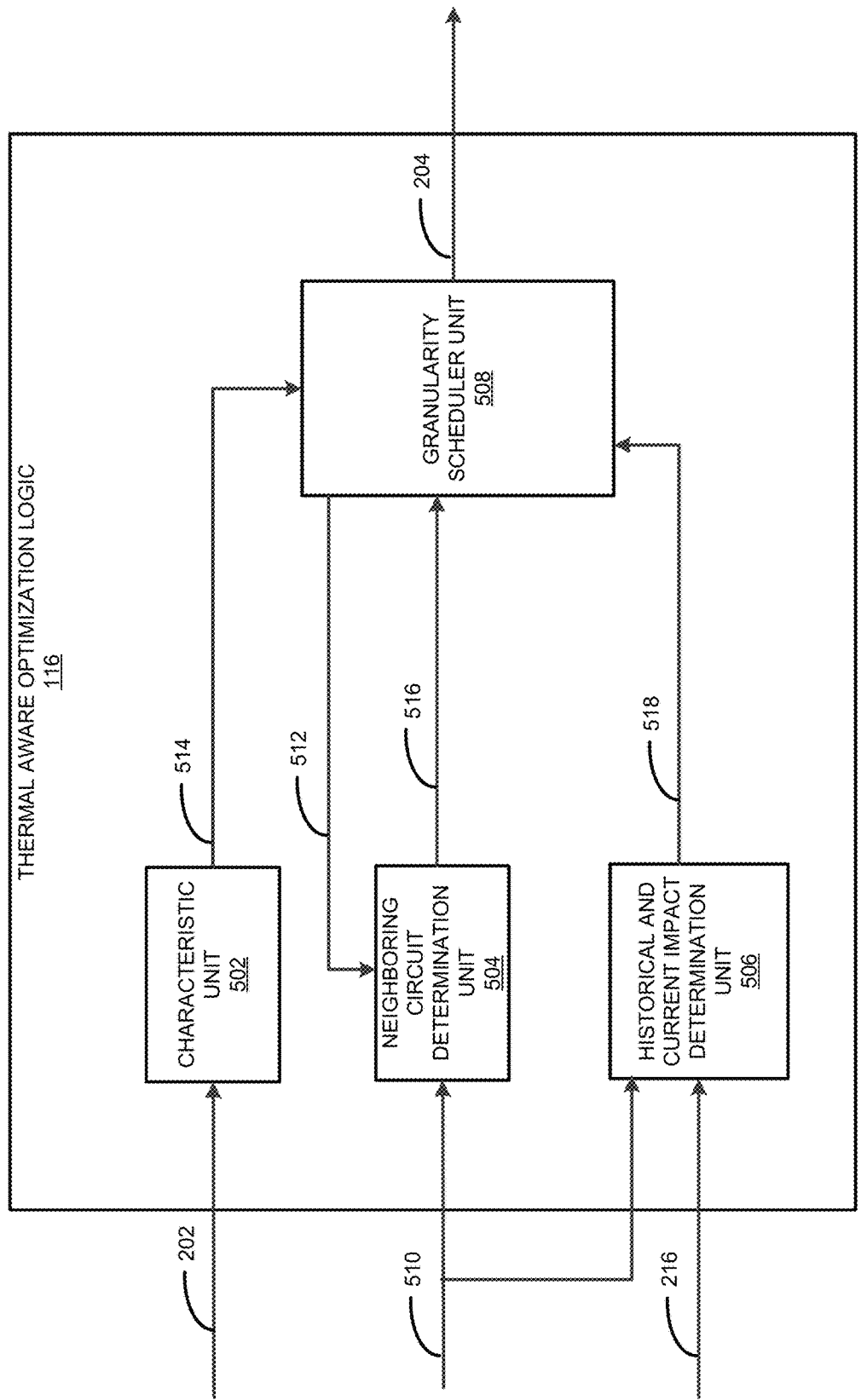
FIG. 5 is a schematic block diagram illustrating an example of a thermal aware optimization logic for distributing threads among multiple compute units in accordance with one variation set forth in the disclosure.

FIG. 5 illustrates an example of the thermal aware optimization logic 116 shown in FIGS. 1 and 2. However, any suitable structure can be employed. The logic 116 includes a characteristic unit 502, a neighboring circuit determination unit 504, a historical and current impact determination unit 506, and a granularity scheduler unit 508. Although these sub-units 502, 504, 506, and/or 508 are illustrated as children units subordinate of the parent logic 116, each sub-unit can be operated as a separate unit from the logic 116, and other suitable combinations of sub-units are contemplated to suit different applications.

In some examples, the logic 116 is a thermal aware hardware scheduler, thermal aware hardware dispatcher, and/or a thermal aware hardware shader processor input (SPI) within a GPU, such as the GPU 104. However, in other examples, the logic 116 is any thermal aware wavefront distribution component that obtains and/or distributes wavefronts to selected CUs. In yet other examples, the logic 116 is any suitable logic configuration including, but not limited to, one or more state machines, one or more digital signal processors, as part of one or more CPUs, GPUs, APUs or processors that execute kernels, and/or other suitable structure as desired. As used herein, the term "unit" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality.

Figure 6:
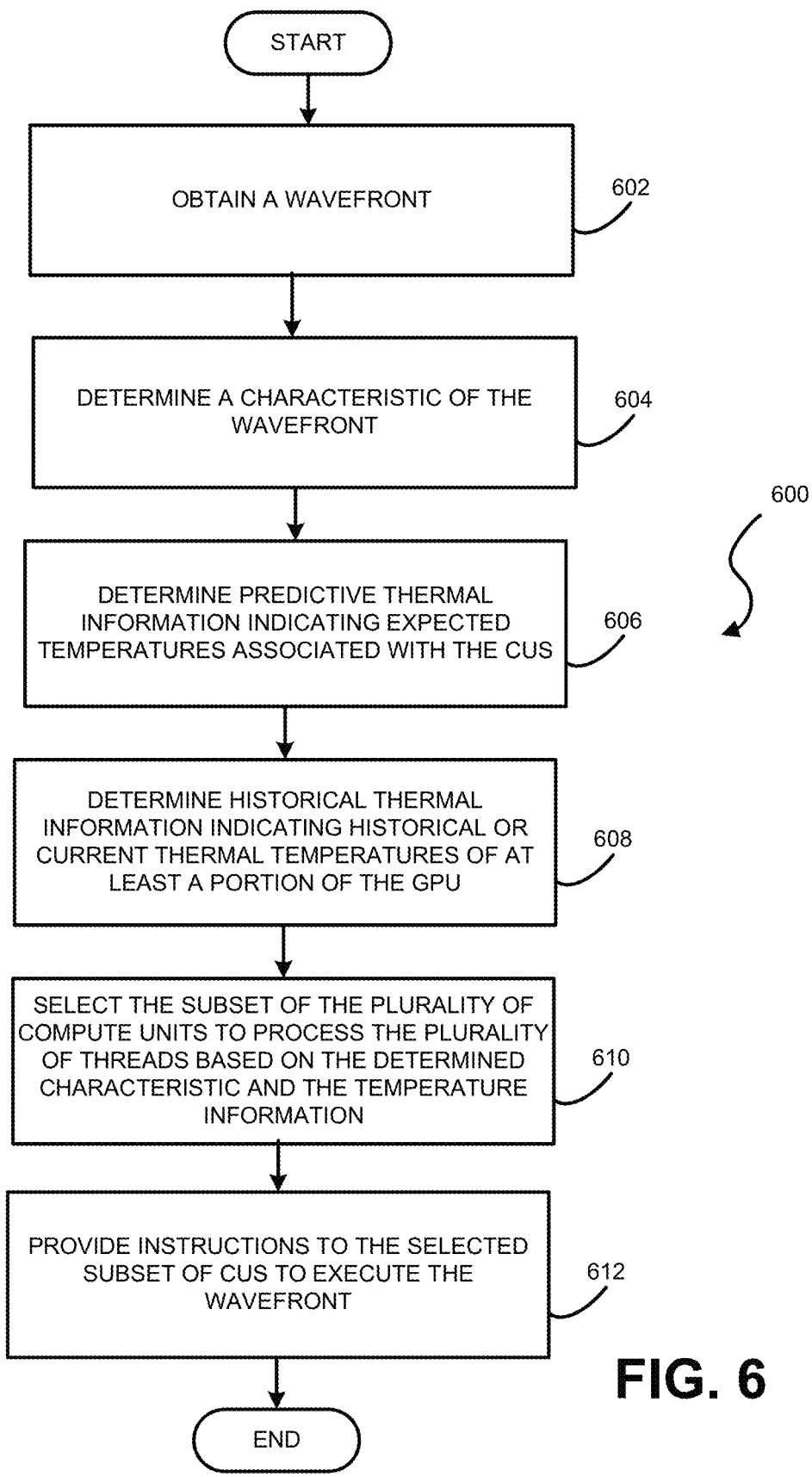
FIG. 6 is a flowchart illustrating a method for providing workload distribution of threads among multiple compute units in accordance with one variation set forth in the disclosure.

FIG. 6 illustrates an example of a method 600 for providing workload distribution of a wavefront among CUs. FIG. 6 will be described with reference to the apparatus 100 illustrated in FIGS. 1, 2, and 3 and the logic 116 illustrated in FIG. 5. However, any suitable structure can be employed.

In operation, at step 602, the logic 116 obtains a wavefront. For example, the characteristic unit 502 obtains information 202 including one or more wavefronts from the work queue buffer 118. As mentioned previously, a wavefront is multiple or a set of threads.

At step 604, the characteristic unit 502 determines a characteristic (e.g., workload) of the wavefront. For example, the characteristic unit 502 categories the obtained wavefront into one or more types of wavefronts. The characteristic unit 502 provides information 514 indicating the characteristic of the wavefront to the neighboring circuit determination unit 504 and/or the granularity scheduler unit 508. The types of wavefronts include, but are not limited to, a compute intensive wavefront, a memory intensive wavefront, and/or a mixed (e.g., mixture of computational intensive and memory intensive) wavefront.

The logic 116 selects CUs to execute the wavefront based on the characteristic (e.g., type or workload) of the wavefront. For example, the logic 116 provides thermal aware distribution of wavefronts to reduce the temperature of the GPU 104 (e.g., on-die temperatures), prevent reduction in performance of the GPU 104 due to premature throttling of clock frequencies, and/or prevent the GPU 104 from overheating. The type or characteristic of the wavefront impacts the temperature of the GPU 104 differently.

For example, a memory intensive wavefront has a lower thermal impact when compared to a compute intensive wavefront. A mixed intensive wavefront has a higher thermal impact than a memory intensive wavefront, but a lower thermal impact than a compute intensive wavefront. In other words, a memory bound application or wavefront will have lower steady state temperature when compared to a compute intensive application or wavefront. Thus, if a particular CU is executing a compute intensive wavefront, the temperature of the neighboring CUs gets impacted due to thermal coupling. Therefore, the logic 116 distributes wavefronts to selected CUs to prevent a reduction in the amount of performance wavefronts currently being executed by neighboring CUs or about to be scheduled to the neighboring CUs.

To limit or reduce the thermal impact of the wavefront, the characteristic unit 502 determines the characteristic of the wavefront. In some example, the characteristic unit 502 determines the characteristic of the wavefront based on analyzing threads within the wavefront. For example, by determining a ratio between a number of operations within the wavefront and a number of bits transferred for the wavefront (e.g., the number of bits transferred between second processor, such as GPU 104, and the system memory 120), the characteristic unit 502 determines whether the characteristic of the wavefront is a computational intensive, a memory intensive, or mixed intensive. In other words, if the ratio between, the number of operations within the wavefront and the number of bits transferred for the wavefront is large, then the characteristic unit 502 determines the wavefront is computational intensive. If it is small (e.g., close to 0), the characteristic unit 502 determines the wavefront is memory intensive. If it is in-between, the characteristic unit 502 determines the wavefront is mixed.

In some variations, the characteristic unit 502 uses more or less than the three different types of wavefronts (e.g., computational, memory, mixed) to categorize the wavefront. In one variation, the characteristic unit 502 uses five or ten classifications (e.g., characteristics) of wavefronts. For example, if the ratio between a number of operations within the wavefront and the number of bits transferred for the wavefront is above a first threshold, then the characteristic unit 502 determines the characteristic of the wavefront is a first characteristic. If the ratio between a number of operations within the wavefront and the number of bits transferred for the wavefront is above a second threshold and below the first threshold, then the characteristic unit 502 determines the characteristic of the wavefront is a second characteristic, and so on.

At step 606, the logic 116 determines thermal information for the GPU 104, such as predictive thermal information indicating expected and/or predicted temperatures associated with the CUs and/or a sub-set of the CUs (e.g., CUs 206, 208, 210, 212). For example, the neighborhood circuit determination unit 504 determines expected or predicted temperature readings of the CUs and/or a subset of the CUs based on information 510 indicating locations of the components within the GPU 104 and/or other GPUs 106, 108, or 110.

For instance, the neighborhood circuit determination unit 504 obtains information 510 indicating locations (e.g., x, y, and/or z coordinates) of components within the GPU 104 (e.g., intra-chip components) and/or other GPUs 106, 108, 110 (e.g., inter-chip components). Referring to FIG. 2, among other components, the GPU 104 includes non-CU circuitry 220, non-CU circuitry 222, and/or the processing units 114. The information 510 indicates locations or the x, y, and/or z coordinates of location of the components (e.g., the non-CU circuitry 220, 222) within the GPU 104. Additionally, and/or alternatively, the information 510 indicates locations of individual CUs within the processing units 114, such as CUs 206, 208, 210, 212. Similarly, in some examples, the neighborhood circuit determination unit 504 also obtains locations of inter-chip components for the other GPUs 106, 108, and/or 110, which will be described below in FIG. 8.

The neighborhood circuit determination unit 504 uses information 510 to determine expected or predicted temperatures for at least a portion of the GPU 104, such as a portion including one or more CUs and/or one or more sub-sets of CUs 206. For instance, particular components of the GPUs are heat sources and have an expected or predicted temperature output associated with typical operation of the component. For example, if the non-CU circuitry 220 is a memory controller, the neighborhood circuit determination unit 504 determines an expected or predicted temperature of the memory controller during normal operation. Similarly, the neighborhood circuit determination unit 504 determines expected or predicted temperatures for the CUs, including the portion of CUs and/or other CUs within the GPU 104.

Based on the information 510, the neighborhood circuit determination unit 504 generates information 516 indicating expected or predicted temperatures at different locations within the GPU 104. For example, using the x, y, and/or z coordinates of the components within the GPU 104 and the expected or predicted temperatures of the components, the neighborhood circuit determination unit 504 generates an expected or predicted heat map of at least a portion of the GPU 104 (e.g., a portion surrounding the CUs and/or subset of CUs). The circuit determination unit 504 provides the predictive thermal information 516 to the granularity scheduler unit 508 and/or stores the information 516 in memory, such as cache memory or system memory.

In some variations, the neighborhood determination unit 504 also uses information 512 indicating characteristic of the wavefront and the selected CUs to execute the wavefront to determine and/or update the predictive thermal information 516. In other words, the neighborhood determination unit 504 determines where the CUs 206, 208, 210, 212 are located (x, y, z coordinates) and the wavefronts and/or characteristics of the wavefronts being executed by the CUs 206, 208, 210, 212.

For example, as will be explained below, the granularity scheduler unit 508 selects one or more CUs (e.g., from the CUs 206, 208, 210, 212) to execute the wavefront. Further, as mentioned above, the granularity scheduler unit 508 obtains characteristics for the wavefront. After the selection, the neighborhood determination unit 504 obtains information 512 indicating the characteristic of the wavefront and/or the selected CUs to execute the wavefront. As mentioned above, the information 510 indicates the location of the CUs 206, 208, 210, 212. Using information 510 and 512, the neighborhood determination unit 504 determines the locations of the CUs 206, 208, 210, 212 and the wavefronts/characteristics of the wavefronts being executed by the CUs 206, 208, 210, 212. The characteristics of the wavefronts are associated with certain expected or predicted temperatures (e.g., computational intensive wavefronts have a first temperature, memory intensive wavefronts have a second temperature, and mixed wavefronts have a third temperature). Based on the determination, the neighborhood determination unit 504 generates and/or updates the predictive thermal information 516 indicating expected or predicted temperatures at different locations within the GPU 104.

In some examples, after each selection or after a group of selections (e.g., 5 selections), the neighborhood determination unit 504 updates the predictive thermal information 516 using the selected CUs 206, 208, 210, 212 and the characteristics of the wavefronts. Additionally, and/or alternatively, after execution of the wavefront ends, the neighborhood determination unit 504 updates the predictive thermal information 516 to indicate the CUs 206, 208, 210, 212 have finished executing the wavefront. As such, the neighborhood determination unit 504 constantly updates the predictive thermal information 516 to indicate the latest predicted and/or expected temperatures for the GPU 104, including the CUs 206, 208, 210, 212 executing wavefronts with different characteristics.

At step 608, the logic 116 (e.g., the historical and current impact determination unit 506) determines thermal information for the CUs, such as historical thermal information 518 indicating historical or current thermal temperatures, of at least a portion of the GPU 104. The unit 506 provides the historical thermal information 518 to the granularity scheduler unit 508. For example, referring to FIGS. 2 and 3, temperature sensors 214 provide information 216 indicating current temperatures of the CUs 206, 208, 210, 212 and/or temperatures at different locations of the processing units 114. Additionally, and/or alternatively, additional temperature sensors 214 are included at locations within the GPU 104, such as operatively coupled to the non-CU circuitry 220 and/or 222 and/or at various other locations within the GPU 104.

The historical and current impact determination unit 506 (unit 506) obtains information 216 and generates historical thermal information 518 using the information 216. In other words, the unit 506 generates information 518 indicating a heat map for a portion of the GPU 104, such as for a region surrounding a CU or set of CUs, the processing units 114, and/or the entire GPU 104. In some examples, the information 216 indicates a particular temperature sensor 214 and the corresponding temperature reading but does not indicate the location of the temperature sensor 214. As such, the unit 506 obtains information 510 indicating locations of components, such as the temperature sensors 214, within the GPU 104. The unit 506 uses the information 510 and 216 to generate information 518 indicating the heat map for a portion of the GPU 104.

In some examples, information 518 indicates current temperatures and previous temperatures (e.g., 5 or 10 previous temperatures) of the GPU 104. For example, after generating a heat map indicating the current temperatures for the GPU 104, the unit 506 stores in memory (e.g., cache memory 118 and/or system memory 120) the current heat map. Then, the unit 506 retrieves the heat maps for previous temperatures of the GPU 104 from memory and provides information 518 indicating current and previous temperatures to the granularity scheduler unit 508.

Figure 7:
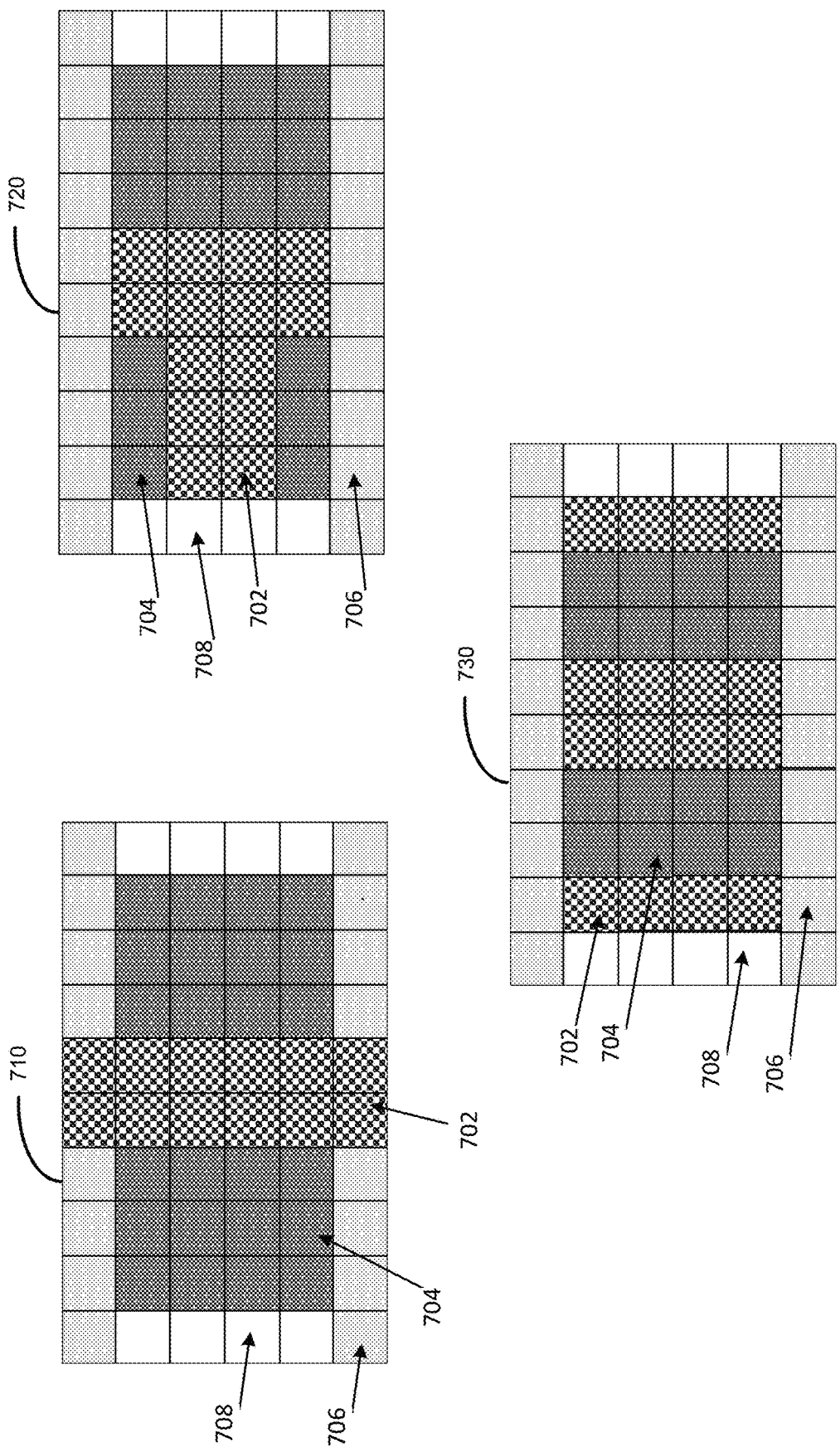
FIG. 7 illustrates an example of a heat map of a graphics processing unit in accordance with one variation set forth in the disclosure.

FIG. 7 shows an exemplary heat map for a GPU, such as GPU 104. For example, three heat maps 710, 720, and 730 of a second processor, such as GPU 104, are shown. The heat maps 710, 720, 730 indicate the current temperatures of the GPU 104 and/or the stored (e.g., previous) temperatures of the GPU 104. As shown in the heat maps 710, 720, 730, the unit 506 determines and/or categories portions of the GPU 104 based on the temperature readings. For example, based on the temperature readings, the unit 506 determines whether the portion of the GPU 104 has a very high temperature reading 702, a high temperature reading 704, a medium temperature reading 706, and/or a low temperature reading 708. The unit 506 provides the information indicating the heat maps 710, 720, 730 to the granularity scheduler unit 508.

At step 610, the logic 116 (e.g., the granularity scheduler unit 508) selects a subset (e.g., one or more) of the CUs 206, 208, 210, 212 to process the wavefront (e.g., threads) based on the determined characteristic of the wavefront and the temperature information (e.g., historical thermal information 518 and/or the predictive thermal information 516). For example, the granularity scheduler unit 508 (unit 508) selects one or more CUs to process or execute the wavefront to minimize the thermal impact on the GPU 104. In other words, the CUs are selected based on characteristics of the wavefront and/or thermal information (e.g., proximity of predicted or actual heat sources to CUs) to minimize and/or reduce the cost (e.g., temperature cost) for the CUs 206, 208, 210, 212 within the GPU 104.

In some examples, unit 508 uses data representing a function to minimize the thermal impact (e.g., temperature cost). For example, the unit 508 uses the below function to minimize the thermal impact.

$$\min \sum_{i=1}^{N_{CU}} \tau_i$$

where $\tau_i = l_i w_i$

For instance, $\tau_i$ represents the thermal impact of a compute unit (CU), such as compute unit, i, to execute the wavefront. $w_i$ represents the thermal impact associated with the characteristics of the wavefront to be scheduled on the CUs (e.g., information 514 indicating the characteristic of the wavefront). $N_{CU}$ represents the total number of compute units within the processing units 114 and/or the GPU 104. $l_i$ represents the thermal impact associated with the physical location of the CU. In other words, $l_i$ represents the proximity to well-known, predicted, or expected heat sources (e.g., components of the GPU) and/or the temperature history of the neighboring CUs and/or the GPU 104 (e.g., the current and/or historical temperature readings of the GPU). In other words, $l_i$ represents and/or is based on the predictive thermal information 516 and/or the historical thermal information 518. The unit 508 solves the equation to determine and select the CUs 206, 208, 210, 212 that will minimize the thermal impact (e.g., the temperature cost).

In some instances, the unit 508 solves the equation above using O(n log n) operations where n=$N_{cu}$ (e.g., the number of total compute units). For example, the unit 508 determines two arrays (e.g., a container object that holds a fixed number of values of a single type) based on the equation above. The unit 508 then multiplies a minimum element of one array with a maximum element of the other array to determine and/or select the CUs 206, 208, 210, 212 that will minimize the thermal impact. In other words, the unit 508 determines two arrays, one array for $l_i$ and another array for $w_i$. The unit 508 sorts the arrays (e.g., ascending for $l_i$ and descending for $w_i$) and multiplies the arrays together to determine/select the CUs.

In some variations, the unit 508 selects a single CU from the CUs 206, 208, 210, 212 to execute or process the wavefront. In other variations, the unit 508 selects two or more CUs 206, 208, 210, 212 to execute the wavefront. Additionally, and/or alternatively, the selected CUs are not directly adjacent to each other. For example, the unit 508 uses the function above and selects idle CUs that are not adjacent, such as one idle CU from CU 206 and another idle CU from CU 212. Additionally, and/or alternatively, the unit 508 uses the function above to distribute the wavefront across the GPU 104 and/or processing unit 114. For example, the unit 508 uses the function to distribute and skip a number of idle CUs (e.g., every other idle CU or every two idle CUs) to execute or process the wavefront.

In some variations, the unit 508 selects CUs based on their physical location on the GPU 104 since some CUs dissipate heat better than others. For instance, in some examples, the air flows from right to left. The CUs 208, 212 in the right side of the GPU 104 have comparatively lower temperature than the left side 206, 210. Further, CUs on the left most side and CUs in the middle are closer to peripheral logic (e.g., non-CU circuitry) which results in relatively higher temperature. As such, the unit 508 selects CUs based on the ability for CUs to dissipate heat (e.g., right side of GPU 104 for compute intensive and left side for memory intensive).

At step 612, the logic 116 (e.g., unit 508) provides instructions (e.g., information 204) to the selected subset (one or more) of CUs 206, 208, 210, 212 to execute the wavefront. For example, the logic 116 provides information 204 via bus 302 to the different CUs 206, 208, 210, 212 to execute the wavefront. In some instances, the logic 116 selects CUs to execute wavefronts at different levels of granularity based on timing constraints. For example, as described above, the logic 116 selects CUs to wavefronts one by one. In other instances, the logic 116 selects CUs to execute wavefronts in larger batches (e.g., in groups of 5 or 10 wavefronts at a time).

Figure 8:
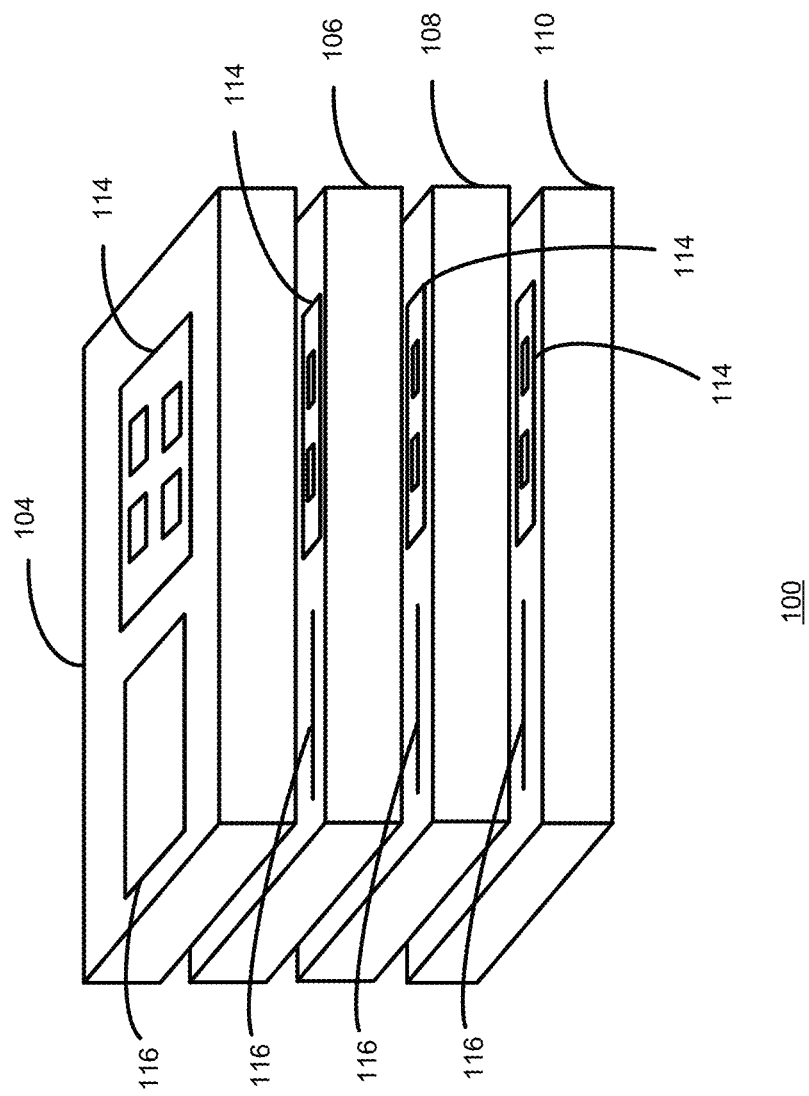
FIG. 8 is an exemplary representation of one or more layered graphics processing units in accordance with one variation set forth in the disclosure.

FIG. 8 illustrates an example embodiment and/or layout of the GPUs 104, 106, 108, 110 within the apparatus 100. For example, GPUs 104, 106, 108, 110 are stacked or layered on top of each other within the apparatus 100. In other words, the GPUs 104, 106, 108, 110 are in 2.5-D or 3-D stacks. Each GPU 104, 106, 108, 110 includes temperature sensors 214 and processing units 114 with CUs. Further, each GPU 104, 106, 108, 110 includes at least one thermal aware optimization logic 116 that provides instructions to the CUs to execute wavefronts.

In some examples, the logic 116 obtains information, such as information 510, indicating locations of inter-chip components of the other GPUs. The logic 116 uses this information 510 to generate and/or update the predictive thermal information 516 and/or the historical thermal information 518. The logic 116 then provides the information 518 and 516 to the granularity scheduler unit 508. For example, the logic 116 is located at a first GPU, such as GPU 108. The logic 116 obtains information 510 indicating locations of components from other GPUs, such as GPUs layered above (e.g., GPU 106) and/or below (e.g., GPU 110) the first GPU. Similar to above, the logic 116 of the GPU 108 uses information 510 to generate and/or update predictive thermal information 516 indicating expected or predicted temperatures for the GPU 108.

Additionally, and/or alternatively, the logic 116 is in communication with components from the other GPUs (e.g., inter-chip components). As such, the logic 116 obtains wavefronts being executed by CUs from the other GPUs (e.g., GPU 106 and/or 108). The logic 116 generates and/or updates the predictive thermal information 516 based on the wavefronts being executed by CUs from the other GPUs. Then, the granularity scheduler unit 508 uses the predictive thermal information 516 indicating the wavefronts being executed by CUs from other GPUs to select CUs to execute the wavefront.

Additionally, and/or alternatively, the logic 116 is in communication with temperature sensors 214 from the other GPUs (e.g., GPU 106 and/or 108). The logic 116 uses information from the temperature sensors 214 from the other GPUs to generate historical thermal information 518 indicating current and/or historical temperature information for the other GPUs. Then, the granularity scheduler unit 508 uses the historical thermal information 518 indicating the temperature information for the other GPUs to select CUs to execute the wavefront.

Among other technical benefits, some examples allow performance of the GPUs to be boosted for comparatively longer periods of time. For example, by using the thermal aware optimization logic 116, the CU power can be boosted by up to 20% till 95° C. is reached (assuming 95° C. is the critical temperature limit). The additional power gets translated to better performance.

The above detailed description of the present disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. A method for providing workload distribution of a plurality of threads among a plurality of compute units (CUs) in one or more cores, comprising:
   determining a characteristic of the plurality of threads based on a number of operations of the plurality of threads and a number bits transferred by the plurality of threads;
   determining temperature information corresponding to at least a subset of the plurality of CUs in the one or more cores, wherein the temperature information comprises:
      predictive thermal information indicating expected temperatures corresponding to at least the subset of the plurality of CUs; and
      historical thermal information indicating current or past thermal temperatures of at least a portion of a GPU;
   selecting the subset of the plurality of CUs to process the plurality of threads based on the determined characteristic and the temperature information; and
   providing instructions to the selected subset of the plurality of CUs to execute the plurality of threads.

2. The method of claim 1, wherein the determining the predictive thermal information comprises:
   determining a plurality of characteristics for a plurality of second threads currently being executed by the plurality of CUs; and
   generating the predictive thermal information based on the plurality of characteristics for the plurality of second threads currently being executed by the plurality of CUs.

3. The method of claim 1, wherein the at least the portion of the GPU comprises at least one non-CU circuitry, and wherein the determining the predictive thermal information comprises generating the predictive thermal information based on a location of the at least one non-CU circuitry.

4. The method of claim 1, further comprising:
   obtaining temperature readings from a plurality of temperature sensors; and
   generating the historical thermal information based on the temperature readings from the plurality of temperature sensors.

5. The method of claim 1, wherein the GPU is a first processor and the subset of the plurality of CUs is on a second processor, and wherein the method further comprises:
   determining a plurality of characteristics for a second plurality of threads currently being executed by a second plurality of CUs on a third processor, wherein the second processor and the third processor are stacked on top of each other; and generating the predictive thermal information based on the plurality of characteristics for the second plurality of threads currently being executed by the second plurality of CUs.

6. The method of claim 5, wherein the third processor comprises at least one non-CU circuitry, and wherein the determining the predictive thermal information comprises generating the predictive thermal information based on a location of the at least one non-CU circuitry.

7. The method of claim 6, wherein the third processor comprises a second plurality of temperature sensors, and wherein the method further comprises:

obtaining temperature readings from the second plurality of temperature sensors; and generating the historical thermal information based on the temperature readings from the second plurality of temperature sensors.

8. The method of claim 1, wherein the determining the characteristic of the plurality of threads comprises:

determining whether the plurality of threads is a memory intensive plurality of threads, a computational intensive plurality of threads, or a memory and computational intensive plurality of threads.

9. The method of claim 8, wherein the selecting the subset of the plurality of CUs is based on whether the plurality of threads is the memory intensive plurality of threads, the computational intensive plurality of threads, or the memory and computational intensive plurality of threads.

10. An apparatus for providing workload distribution of a plurality of threads among a plurality of CUs, comprising:

a first processor, wherein the first processor comprises:

a plurality of compute units (CU) configured to execute the plurality of threads; and thermal aware optimization logic, wherein the thermal aware optimization logic is configured to:

determine a characteristic of the plurality of threads based on a number of operations of the plurality of threads and a number of bits transferred by the plurality of threads;

determine temperature information corresponding to at least a subset of the plurality of CUs, wherein the temperature information comprises:

predictive thermal information indicating expected temperatures corresponding to at least the subset of the plurality of CUs; and historical thermal information indicating current or past thermal temperatures of at least a portion of the first processor;

select the subset of the plurality of CUs to process the plurality of threads based on the determined characteristic and the temperature information; and provide instructions to the selected subset of the plurality of CUs to execute the plurality of threads.

11. The apparatus of claim 10, wherein the thermal aware optimization logic is configured to determine the predictive thermal information by:

determining a plurality of characteristics for a plurality of second threads currently being executed by the plurality of CUs; and generating the predictive thermal information based on the plurality of characteristics for the plurality of second threads currently being executed by the plurality of CUs.

12. The apparatus of claim 10, wherein the first processor is a graphics processing unit (GPU) and the portion of the GPU comprises at least one non-CU circuitry, and wherein the thermal aware optimization logic is configured to determine the predictive thermal information by generating the predictive thermal information based on a location of the at least one non-CU circuitry.

13. The apparatus of claim 10, wherein a second processor further comprises a plurality of temperature sensors configured to provide temperature readings to the thermal aware optimization logic, and wherein the thermal aware optimization logic is configured to:

obtain temperature readings from the plurality of temperature sensors; and generate the historical thermal information based on the temperature readings from the plurality of temperature sensors.

14. The apparatus of claim 13, further comprising:

a third processor, wherein the second processor and the third processor are stacked on top of each other, wherein the third processor comprises a second plurality of CUs, and wherein the thermal aware optimization logic is configured to determine the predictive thermal information by:

determining a plurality of characteristics for a second plurality of threads currently being executed by the second plurality of CUs; and generating the predictive thermal information based on the plurality of characteristics for the second plurality of threads currently being executed by the second plurality of CUs.

15. The apparatus of claim 14, wherein the third processor comprises at least one non-CU circuitry, and wherein the thermal aware optimization logic is configured to determine the predictive thermal information by generating the predictive thermal information based on a location of the at least one non-CU circuitry.

16. The apparatus of claim 15, wherein the third processor comprises a second plurality of temperature sensors configured to provide temperature readings to the thermal aware optimization logic, and wherein the thermal aware optimization logic is configured to:

obtain temperature readings from the second plurality of temperature sensors; and generate the historical thermal information based on the temperature readings from the second plurality of temperature sensors.

17. The apparatus of claim 10, wherein the thermal aware optimization logic is configured to determine the characteristic of the plurality of threads by:

determining whether the plurality of threads is a memory intensive plurality of threads, a computational intensive plurality of threads, or a memory and computational intensive plurality of threads.

18. The apparatus of claim 17, wherein the thermal aware optimization logic is configured to select the subset of the plurality of CUs based on whether the plurality of threads is the memory intensive plurality of threads, the computational intensive plurality of threads, or the memory and computational intensive plurality of threads.

19. An apparatus for providing workload distribution of a wavefront among a plurality of CUs, comprising:

a first processor, wherein the first processor comprises:

a plurality of compute units (CU) configured to execute a plurality of threads; and thermal aware optimization logic, wherein the thermal aware optimization logic is configured to:
- determine a characteristic of the plurality of threads based on a number of operations of the plurality of threads and a number of bits transferred by the plurality of threads;
- determine a plurality of characteristics for a plurality of second threads currently being executed by the plurality of CUs; and
- generating predictive thermal information based on the plurality of characteristics for the plurality of second threads currently being executed by the plurality of CUs;
- obtain temperature readings from a plurality of temperature sensors;
- generate historical thermal information based on the temperature readings from the plurality of temperature sensors;
- select a subset of the plurality of CUs to process the plurality of threads based on the determined characteristic, the predictive thermal information, and the historical thermal information; and
- provide instructions to the selected subset of the plurality of CUs to execute the plurality of threads.

20. The apparatus of claim 19, further comprising:
- a second processor, wherein the first processor and the second processor are stacked on top of each other, wherein the second processor comprises a second plurality of CUs, a plurality of second temperature sensors, and
- wherein the thermal aware optimization logic is configured to generate the predictive thermal information by:
  - determining a second plurality of characteristics for a third plurality of threads currently being executed by the second plurality of CUs; and
  - generating the predictive thermal information based on the second plurality of characteristics for the third plurality of threads currently being executed by the second plurality of CUs, and
- wherein the thermal aware optimization logic is configured to generate the historical thermal information by:
  - obtaining temperature readings from the plurality of second temperature sensors; and
  - generating the historical thermal information based on the temperature readings from the plurality of second temperature sensors.

* * * * *